Oct. 31, 1967  N. H. LIEB ET AL  3,349,490
STRAIGHT HANDPIECE
Filed Feb. 20, 1964  7 Sheets-Sheet 1
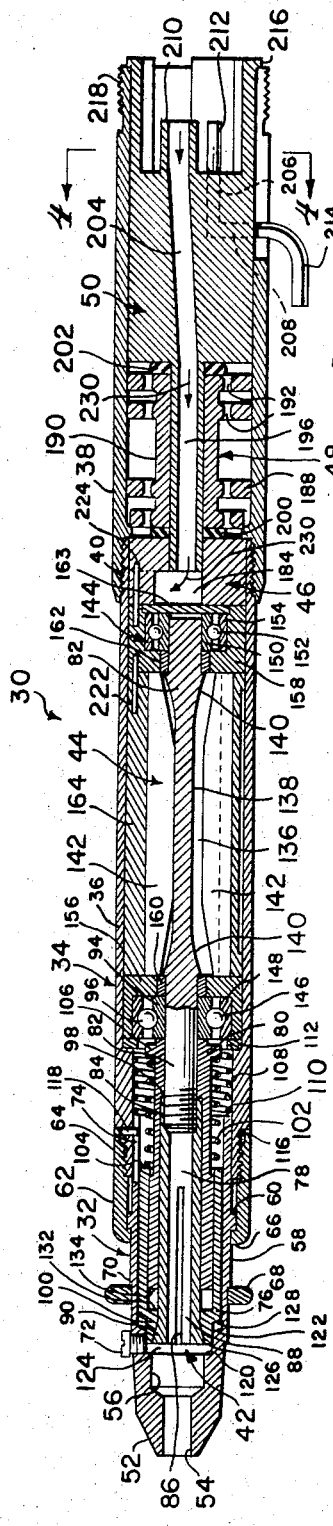
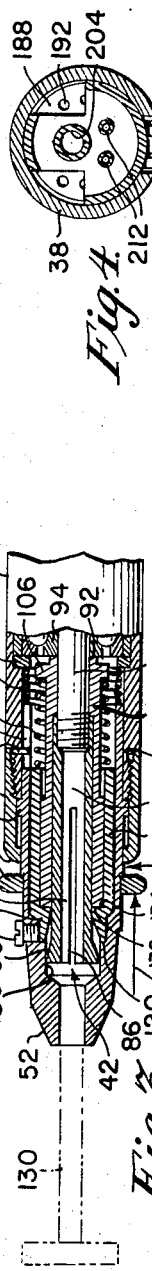
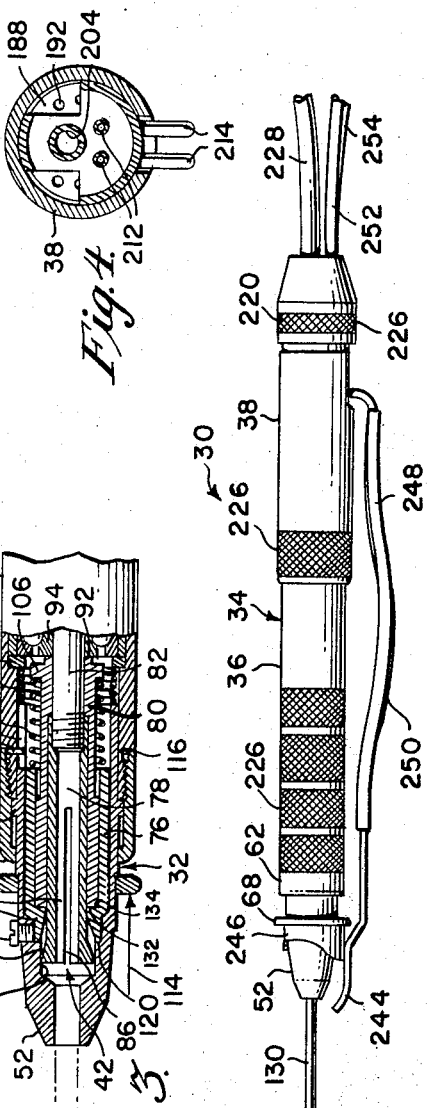
INVENTORS.
NATHANIEL H. LIEB
ANTHONY J. TURCHI
BY
Caesar and Rivise
ATTORNEYS.

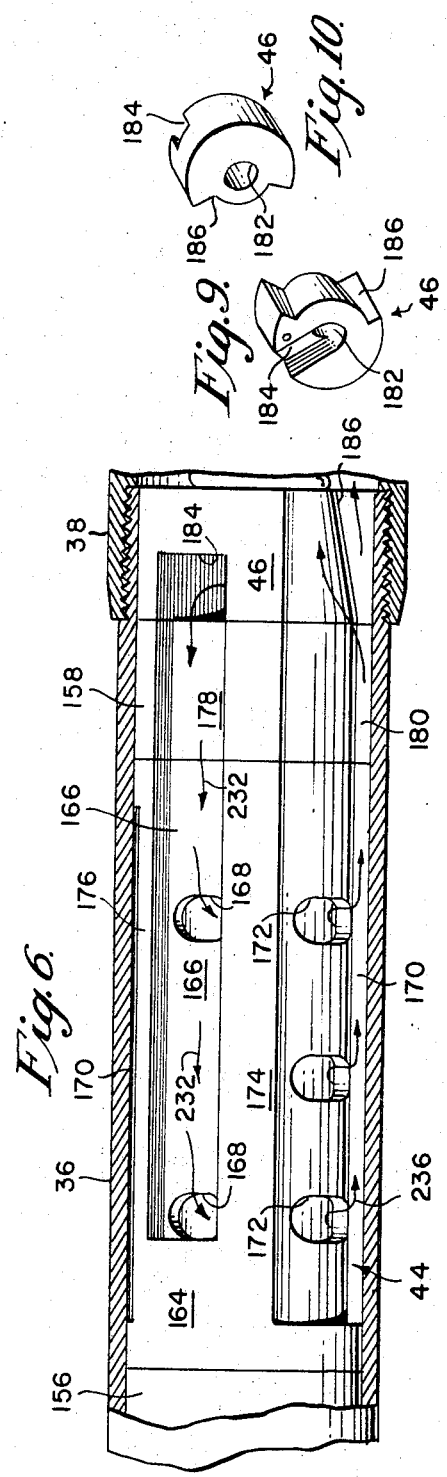
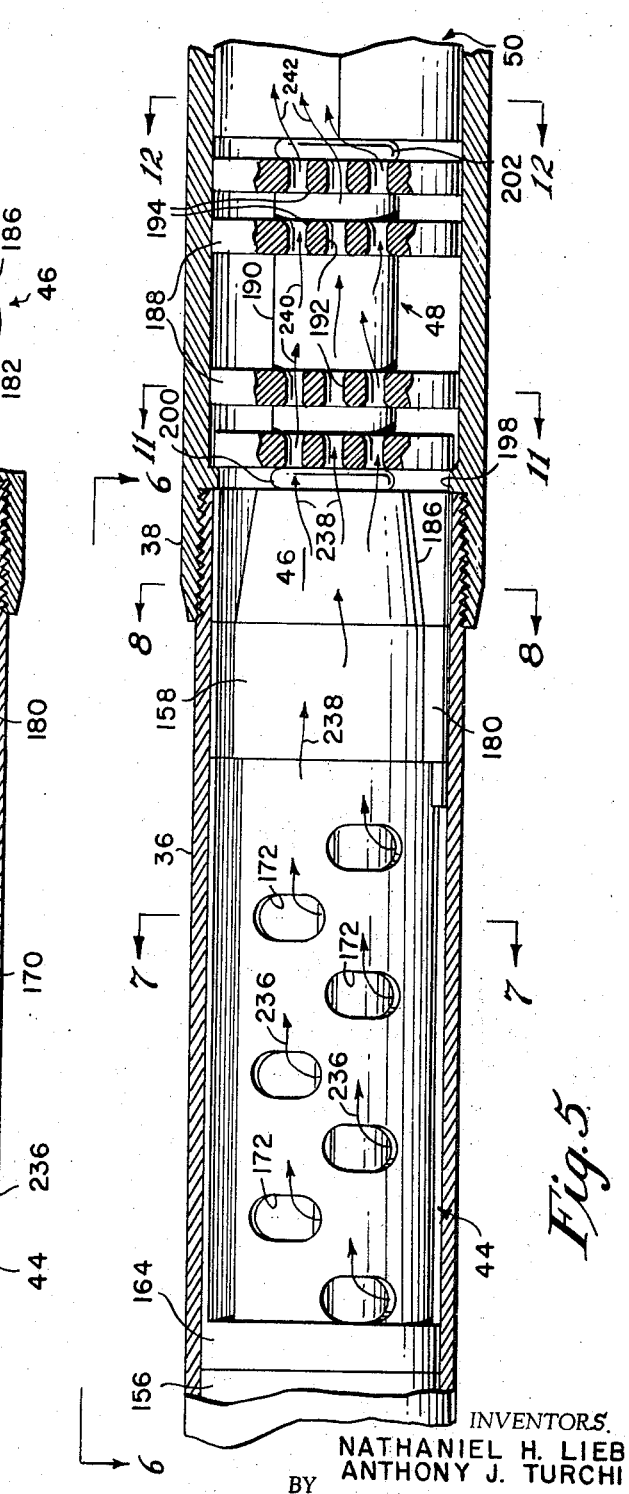

Oct. 31, 1967        N. H. LIEB ET AL         3,349,490
                     STRAIGHT HANDPIECE
Filed Feb. 20, 1964                    7 Sheets-Sheet 3

INVENTORS.
NATHANIEL H. LIEB
BY ANTHONY J. TURCHI

Caesar and Rivise
ATTORNEYS.

Oct. 31, 1967  N. H. LIEB ET AL  3,349,490
STRAIGHT HANDPIECE
Filed Feb. 20, 1964  7 Sheets-Sheet 4

INVENTORS.
NATHANIEL H. LIEB
BY ANTHONY J. TURCHI
Caesar and Rivise
ATTORNEYS.

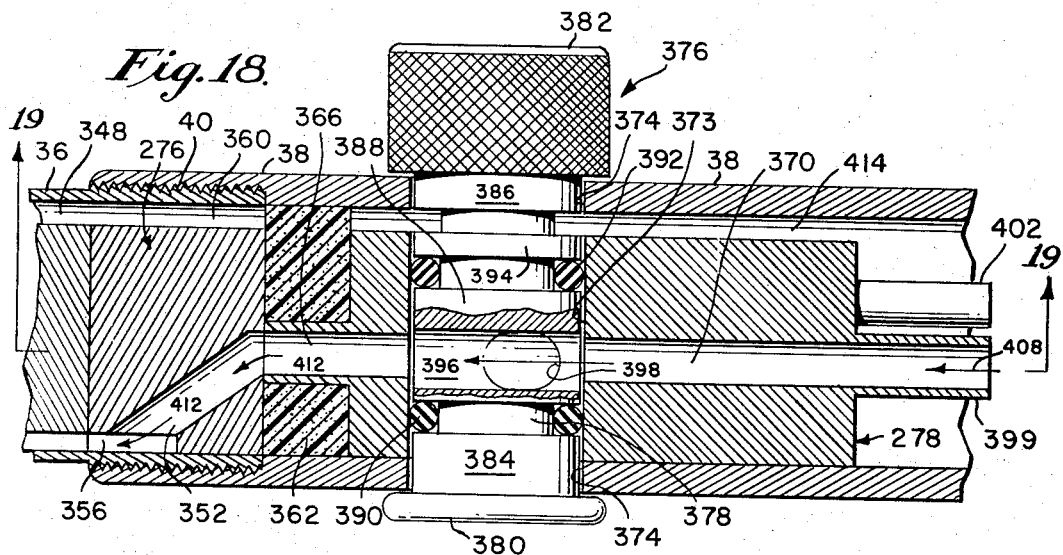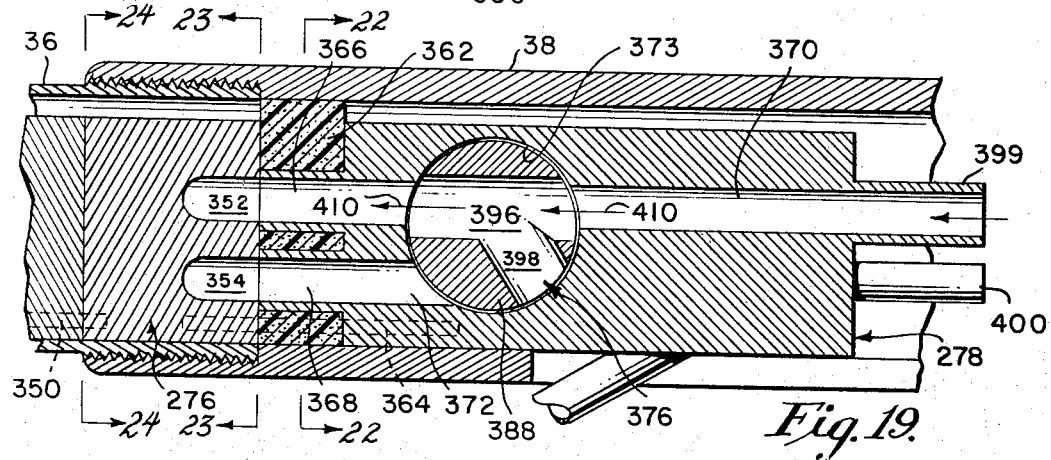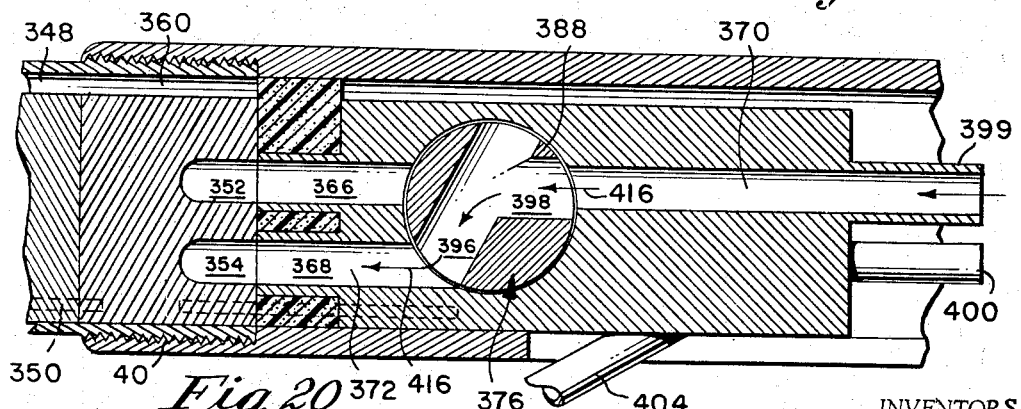

INVENTORS.
NATHANIEL H. LIEB
BY ANTHONY J. TURCHI

Caesar and Rivise

ATTORNEYS.

United States Patent Office 3,349,490
Patented Oct. 31, 1967

3,349,490
STRAIGHT HANDPIECE
Nathaniel H. Lieb, Philadelphia, and Anthony J. Turchi, Bala Cynwyd, Pa., assignors to Star Dental Manufacturing Co., Inc. (also known as Star Dental Manufacturing Company, Inc., and Star Mfg. Co., Inc.), Philadelphia, Pa., a corporation of Delaware
Filed Feb. 20, 1964, Ser. No. 346,336
18 Claims. (Cl. 32—28)

ABSTRACT OF THE DISCLOSURE

A straight dental handpiece which utilizes an air motor for supplying the rotative power to a dental bur. Gearing is provided for reducing the speed and increasing the torque of the air motor, thereby enabling the air driven handpiece to be utilized for low speed techniques which were previously carried out by belt and pulley handpieces.

---

This invention relates to an air driven dental handpiece, and more particularly, to an air driven dental handpiece adapted to be used at low speeds and high torque.

It is known to supply the necessary rotative power to a dental bur by means of a round belt pulley system operatively connected to a source of power. Recently, the demands of high speed dentistry have necessitated the development of improved round belt systems and of flat belt pulley systems in order to effect a dental cutting pulley speed of from 500 to 350,000 r.p.m. These pulley systems are costly, require maintenance, create excessive vibration, are unsightly, and are difficult to store.

Many of the problems caused by the use of pulley systems for speed techniques have been obviated by the advent of air driven dental handpieces using an air turbine to supply the rotative motion of the bur. Using these air driven turbines, rotational speeds of up to 400,000 r.p.m. have been obtained.

Until now, air power has only been effectively used for high speed, low torque cutting. The low speed, high torque cutting is still being done by the old belt and pulley systems. In view of the many uses for low speed, high torque cutting, such as the cleaning of teeth and the removal of final decay near the tooth pulp, these belt and pulley systems are used quite frequently in a dentists work. Many dentists have desired the use of air power for low speed work but this could not be satisfactorily accomplished by use of the air turbines.

The handpiece of this invention operates effectively on air and provides low speed, high torque rotation. By the use of suitable gearing, speeds ranging from 300 to 5,000 r.p.m. are obtainable using the handpiece of this invention. At the same time, torques equal to or greater than those obtained with the conventional belt and pulley systems can be obtained. Therefore, using the handpiece of this invention and an air turbine handpiece, a dentist will have equipment to operate effectively at all speeds solely with the use of air power, thereby obviating the necessity of using the disadvantageous belt and pulley systems.

It is therefore an object of this invention to provide a novel air driven dental handpiece.

It is another object of this invention to provide an air driven dental handpiece adapted to operate at low speed and high torque.

It is a further object of this invention to provide a straight dental handpiece which is adapted to be operated by air.

It is a further object of this invention to provide a dental handpiece embodying a novel chuck assembly.

It is a further object of this invention to provide an air driven dental handpiece having speed reducing means therein.

These and other objects of this invention are accomplished by providing a dental handpiece comprising an elongated housing, chuck means within said housing, said chuck means including a collet having at least two compressible jaws, spring means adapted to effectuate closing of said jaws, an air motor mounted within said housing, said air motor including a rotor which is adapted to rotate said collet, and a conduit for supplying air to rotate said air motor.

Other objects and many of the attendant advantages of this invention will be readily appreciated as the same becomes better understood by reference to the following detailed description when considered in connection with the accompanying drawings wherein:

FIG. 1 is a side elevational view of a first embodiment of the handpiece of this invention;

FIG. 2 is an enlarged longitudinal sectional view of the first embodiment of the handpiece of this invention;

FIG. 3 is a fragmentary sectional view of the chuck means of the embodiment of the handpiece shown in FIG. 2;

FIG. 4 is a sectional view taken along the line 4—4 of FIG. 2;

FIG. 5 is an enlarged fragmentary side view of the motor assembly of the embodiment of FIG. 2, with parts broken away;

FIG. 6 is a plan view taken in the direction of arrows 6—6 of FIG. 5;

FIG. 9 is a perspective view of the manifold of the embodiment of FIG. 2 taken from one side thereof;

FIG. 10 is a perspective view of the manifold of FIG. 9 taken from the opposite side thereof;

FIG. 15 is a side elevational view, partially broken away, of a second embodiment of the handpiece of this invention;

FIG. 16 is an enlarged sectional view taken along the line 16—16 of FIG. 15;

FIG. 17 is an enlarged sectional view taken along the line 17—17 of FIG. 16;

FIG. 18 is an enlarged sectional view taken along the line 18—18 of FIG. 15;

FIG. 19 is a sectional view taken along the line 19—19 of FIG. 18;

FIG. 20 is a sectional view similar to FIG. 19 but showing the air valve in its alternate position;

Figure 7:
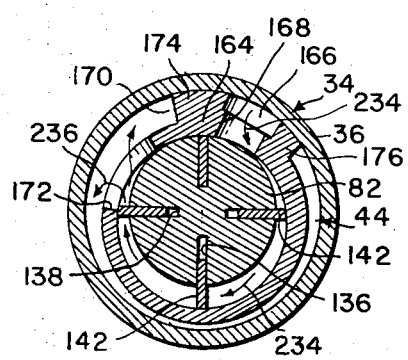
FIG. 7 is a sectional view taken along the line 7—7 of FIG. 5.

Referring now in greater detail to the various figures of the drawing wherein similar reference characters refer to similar parts, a straight handpiece embodying the present invention is generally shown at 30 in FIGS. 1 and 2. As seen in FIG. 2, device 30 basically comprises a nose assembly 32 and a tubular housing 34 comprising a front section 36 and a rear section 38. Rear section 38 is telescoped over the rear of section 36 and threadedly secured thereto, as shown at 40. Within the nose assembly and housing are mounted a chuck assembly 42, an air motor 44, a manifold 46, a muffler 48 and a spray housing 50.

As seen in FIGS. 1 and 3, the nose assembly includes a nose 52 having a central bore 54. Central bore 54 is counter-bored at 56 to provide an enlarged chamber. The remainder of nose 52 comprises a sleeve 58 which is telescoped over and slidable on the chuck assembly 42. Sleeve 58 includes an annular boss 60 which is forwardly spaced from the rear edge thereof. The nose 52 is maintained in position by means of a collar 62 which is telescoped thereover and threadedly secured to tubular housing 34 at 64. Collar 62 has an annular, inwardly projecting flange 66 at the end opposite its threaded end which abuts boss 60 of nose 52.

A ring 68 is telescoped over and secured on sleeve 58. Ring 68 may be held in place by a pressed fit or welding and abuts a raised portion 70 of sleeve 58. A set screw 72 is threadedly secured in the top of nose 52, for a purpose to be described hereinafter. A longitudinal slot 74 extends forwardly from the rear edge of sleeve 58 and is positioned at the top thereof.

The chuck assembly 42 is mounted within nose assembly 32. Chuck assembly 42 basically comprises a collet sleeve 76, a collet 78, and a chuck housing 80. Collet 78 basically comprises a tubular member and is threadedly secured on rotor 82 of air motor 44 at 84. Collet 78 is provided with three longitudinal slots 86 extending inwardly from the forward end thereof, leaving jaws 88 which are spaced by the slots. The forward end of collet 78 is tapered upwardly going from the back to the front, as seen at 90.

Chuck housing 80 is telescoped over collet 78 and has a rear edge 92 which abuts the inner race 94 of ball bearing 96 on motor 44. The chuck housing 80 also includes an intermediate edge 98 which abuts the rear edge of collet 78. Thus, chuck housing 80 is held in place by the threaded securement of collet 78 on rotor 82 and the abutment of edge 98 against the collet and the rear edge of the housing against inner race 94.

The collet sleeve 76 is telescoped over and slidingly engages chuck housing 80. The collet sleeve includes a forward annular flange 100 which slidably engages the tapered forward portion of collet 78. As seen in FIG. 2, taper 100 extends upwardly going from the back to the front of the collet sleeve. Tapers 90 and 100 are complementary with each other, as is also seen in FIG. 2.

A coiled compression spring 102 is telescoped over chuck housing 80 and has one end abutting rear edge 104 of collet sleeve 76 and the other end abutting annular boss 106 projecting from chuck housing 80 adjacent the rear edge thereof. A second compression spring 108 is telescoped over the first compression spring 102. As seen in FIGS. 2 and 3, compression spring 108 has a diameter which is substantially larger than compression spring 102, and is just smaller than the internal diameter of forward section 36 of tubular housing 34. Compression spring 108 has one end abutting the rear edge 110 of sleeve 58 and the other end abutting spacer ring 112.

The use of the chuck assembly 42 is seen in FIGS. 2 and 3. In order to open the jaws of the collet, nose assembly 32 is pushed rearwardly in the direction of arrow 114 (FIG. 3). In order to insure rectilinear motion for the nose assembly, a wire ring 116 is telescoped over the threaded portion of tubular housing 34. Wire ring 116 includes a dependent finger 118 which projects through a hole formed in the top of tube 34 and into the interior of said tube. Finger 118 is positioned in longitudinal slot 74 of sleeve 58. With the finger engaged in the slot, the nose assembly can only move rectilinearly, since the finger will prevent any rotational movement. Alternatively, a set screw could be used instead of finger 118 and its associated ring.

As the nose assembly is pushed back by continual pressure on ring 68 in the direction of arrow 114, edge 120 of bore 56 and edge 122 of bore 124 in nose 52 will contact edges 126 and 128, respectively, of collet sleeve 76. This in turn will force the depression of spring 102. As seen in FIG. 3, when collet sleeve 76 is pushed rearwardly, the pressure on jaws 88 of the collet caused by the mating of tapered edges 90 and 100 is removed. This permits the expansion of the ajws 88 in order to receive the shaft of a bur shown in phantom at 130 in FIG. 3. It should be noted that with the collet sleeve in its retracted position, the front of collet 78 is received in bore 56. A rearward limit for the backward movement of collet sleeve 76 is provided by the contacting of rear edge 132 of flange 100 with forward edge 134 of chuck housing 80. An additional stop is provided by the contacting of boss 60 on nose sleeve 58 with the forward edge of tubular housing 34.

When the shaft of bur 130 is within the collect, the pressure against ring 68 is released. This permits spring 102 to again force collet sleeve 76 forward to the position shown in FIG. 2. The mating of tapered surfaces 90 and 100 causes a compressive force on compressible jaws 88 of the collet. This in turn provides a secure clamping action on the bur. It should also be noted in FIG. 2 that the forward edge 126 of the collet sleeve is longitudinally spaced from edge 120 of nose 52. Thus, when using burs having small diameter shafts, there is sufficient space for collet sleeve 76 to be moved forward a distance greater than that shown in FIG. 2 in order to provide a greater clamping pressure on the jaws of the collet. Thus, as is apparent from FIG. 2, the farther the collet sleeve is forced forward, the greater the collet sleeve is depressed by the co-action of the tapered surfaces.

As will be explained hereinafter, the entire chuck assembly 42 is rotated when rotor 82 is rotated. However, nose assembly 32 remains stationary during this rotation. For this reason, the chuck assembly is spaced from the nose assembly to prevent any friction during rotation. Therefore, it is necessary to insure that nose 52 is maintained out of contact with the chuck assembly after the collet has been opened, as shown in FIG. 3. In order to insure this, spring 108 forces the nose assembly forward when pressure is released from ring 68. The forward limit for the nose assembly is maintained by flange 66 and annular boss 60. It should also be noted that spring 108 is of a sufficient internal diameter to avoid any contact with the chuck assembly during rotation thereof.

As is apparent from FIGS. 2 and 3, chuck housing 80 serves a number of functions. One of these functions is to maintain collet 78 in its linear alignment. Another function is to serve as an end stop for spring 102 by the provision of annular boss 106. Additionally, the chuck housing provides a sliding surface for collet sleeve 76. In this connection, the chuck housing also provides a rearward limit for the collet sleeve which has forward edge 134 which is longitudinally spaced from rear edge 132 of the flange 100 of the collet sleeve.

The rotational power for the collet is obtained through air motor 44. Air motors are well known in the industrial field. However, prior to this invention, they were only used industrially and no successful attempt has been made to use them in dental handpieces. The previous attempts of obtaining low speed, high torque air power for handpieces was through the use of the high speed air turbines in combination with reduction gearing. However, these prior art devices were extremely bulky and cumbersome and could not be used with the same ease of manipulation as the less cumbersome belt and pulley low speed, high torque handpieces. By adapting an air motor to a dental handpiece, the resultant device enjoys all of the advantages of the belt and pulley system with respect to size and ease of manipulation. However, many of the disadvantages of the belt and pulley system have been obviated.

As seen in FIGS. 2 and 7, the air motor comprises a rotor 82 having four equally spaced, longitudinal slots 136 cut therein. As seen in FIG. 2, each of these slots comprises a flat bottom 138 and upwardly tapering sides 140. Mounted within each of these slots and freely slidable therein is a blade or vane 142. Because of the slidable feature of these vanes, air motors of this type are generally referred to as sliding vane motors. As seen in FIG. 2, the vane has a bottom edge which closely conforms in shape to the lower edge of slots 136 and has a flat upper or outer edge.

Rotor 82 is mounted in forward ball bearing 96 and rear ball bearing 144. Forward ball bearing 96 comprises inner race 94, balls 146 and outer race 148. Rear ball bearing 144 comprises inner race 150, balls 152 and outer race 154. Bearing plate 156 encloses forward ball bearing 96 and bearing plate 158 encloses rear ball bearing 144. Spacer rings 160 and 162 are positioned around the rotor and adjacent the front and rear ball bearings, respectively. A baffle 163 covers the rear face of ball bearing 144.

Air motor 44 is mounted in a cylinder 164 which is in turn mounted in the front section 36 of tubular housing 34. As seen in FIGS. 6 and 7, the upper righthand portion of cylinder 164 is recessed, as shown at 166. A pair of ports 168 connect recess 166 with the interior of the cylinder.

Cylinder 164 is reduced in diameter along approximately 315° of its outer circumference, as best seen at 170 in FIG. 7. A plurality of ports 172 connect recess 170 with the interior of the cylinder. Thus, as seen in FIG. 7 recess 166 is physically separated from recess 170 by longitudinally extending portions 174 and 176 which abut the inner wall of housing portion 36. As seen in FIGS. 5 and 6, rear bearing plate 158 has recesses 178 and 180 which are aligned with recesses 166 and 170, respectively. As seen in FIG. 7, rotor 82 is eccentrically mounted within cylinder 164, for a purpose to be explained hereinafter.

Figure 8:
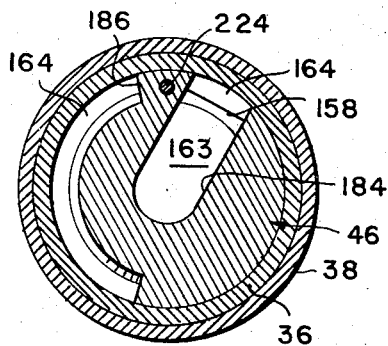
FIG. 8 is a sectional view taken along the line 8—8 of FIG. 5.

Mounted rearwardly of bearing plate 158 and ball bearing 144 is a manifold 46. Manifold 46 is shown in FIGS. 9 and 10. As seen therein, the manifold is basically cylindrical. A central bore 182 is formed therein. Projecting upwardly and to the right from central bore 182 is a channel 184 (FIG. 8). As seen in FIGS. 6 and 8, channel 184 is in communication with channel 178 of bearing plate 158, which is in turn in communication with channel 166 in cylinder 164. As seen in FIG. 8, manifold 46 is also provided with a recess 186 on one side which extends around almost 180° of the circumference of the manifold. As seen in FIGS. 5 and 6, recess 186 tapers upwardly in going from front to back and is contiguous with recess 180 formed in bearing plate 158.

Figure 11:
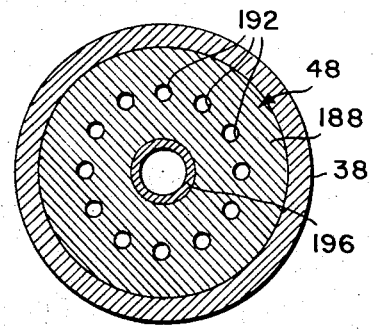
FIG. 11 is a sectional view taken along the line 11—11 of FIG. 5.

Positioned rearwardly of manifold 46 is a muffler 48. Muffler 48 comprises four spaced disks 188 projecting from a central hub 190. As best seen in FIGS. 5 and 11, each disk is provided with a plurality of spaced holes 192 formed therein. As seen in FIGS. 2 and 5, the holes in the four disks are aligned. Each of these holes has a rounded edge 194 (FIG. 5) at the entrance and exit end thereof. The purpose of the rounded edges will be explained hereinafter. As seen in FIGS. 2 and 11, the hub 190 and its associated disks 188 are telescoped over a centrally located conduit 196. As seen in FIG. 2, conduit 196 also passes into bore 182 of manifold 46.

As seen in FIGS. 2 and 5, the first disk 188 is slightly smaller in diameter than the others. This disk abuts annular flange 198 which projects inwardly from section 38 of the tubular housing. An O-ring 200 is telescoped over conduit 196 and separates hub 190 from muffler 48, thereby separating the forwardmost disk 188 from the muffler. A similar O-ring 202 is telescoped over the rear of conduit 196 and separates muffler 48 from spray housing 50.

Figure 12:
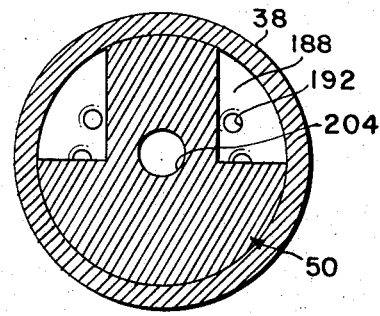
FIG. 12 is a sectional view taken along the line 12—12 of FIG. 5.
Figure 14:
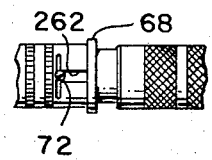
FIG. 14 is a plan view taken in the direction of arrows 14—14 of FIG. 13.

As seen in FIGS. 2, 4 and 12, spray housing 50 is substantially T-shaped with the bridging section being lowermost. A substantially central bore 204 extends longitudinally through the spray housing and is connected to conduit 196. The rear of spray housing 50 is also provided with a pair of adjacent longitudinal bores 206 (one shown). A pair of vertical bores 208 are in communication with bores 206.

A conduit 210 having the same internal diameter as bore 204 extends upwardly from the rear of the bore. Likewise, a pair of conduits 212 extend outwardly from the rear of bores 206. A pair of L-shaped conduits 214 extend outwardly and forwardly of bores 208. As seen in FIGS. 2 and 4, spray housing 50 is provided with a peripheral flange 216 at its rear which abuts the rear edge of tubular section 38. As seen in FIG. 2, the rear end of tubular section 38 is threaded as at 218 in order to receive an adaptor nut 220 (FIG. 1) containing tubes for delivering air and water to the handpiece.

In assembling the handpiece of this invention, a dowel pin 222 is inserted in aligned holes in cylinder 164 of the air motor and bearing plate 158. Additionally, a dowel pin 224 is inserted in aligned holes in bearing plate 158 and manifold 46. These dowel pins assure proper alignment of these elements. As seen in FIG. 1, tubular housing 34 is provided with a number of knurled surfaces 226 in order to facilitate handling and servicing of the handpiece. In use, a bur 130 is inserted into collet 176 in the manner described above. Air is then supplied to the handpiece through tube 228 (FIG. 1). Air conduit 228 is connected to conduit 210 (FIG. 2) and held in place by adaptor nut 220. The air then proceeds through bore 204, conduit 196 and into channel 184 of the muffler 48. This air path is indicated by arrows 230 in FIG. 2. As indicated by arrows 232 in FIG. 6, the incoming air leaves channel 184, proceeds through recess 178 and bearing plate 158, through recess 166 and cylinder 164 and into ports 168 of the cylinder.

As seen in FIG. 7, the air entering ports 168 will impinge upon rotor 82 of the air motor. As previously pointed out, the rotor is eccentrically mounted within cylinder 164. As seen in FIG. 7, the top of the rotor abuts the top of cylinder 164, with the sides and bottom of the rotor being spaced from the respective sides and bottom of the cylinder. Thus, the air entering port 168 will follow the path of least resistance, which is clockwise in the embodiment shown in FIG. 7. As seen therein, the rotor is spaced from the cylinder in a clockwise direction, whereas it abuts the cylinder in a counterclockwise direction, thereby impeding air flow.

As previously pointed out, vanes 142 are freely slidable in slots 136. Therefore, even when the air motor is not rotating, the lowermost vane will abut the base of cylinder 164 in view of the force of gravity causing sliding of the vanes from its slot. Therefore, when air enters the cylinder in the direction of arrows 134, the lowermost vane will be contacted by the incoming air. Since the air motor is freely rotatable in its bearings, this will cause rotation of the rotor in a clockwise direction. Once the motor starts its rotational movement, the other vanes are forced from their slots by both centrifugal force and the force of gravity. As the rotor proceeds in its rotation, the vanes on the upward movement are pushed back into the slots by the action of the cylinder bearing against them. Thus, as seen in FIGS. 2 and 7, the uppermost vane is completely depressed within its slot while the lowermost vane is removed from the slots to the greatest extent possible. The two side vanes are in intermediate positions.

So long as the supply of air is continued, the air motor will continue to rotate. The air in the motor is exhausted through ports 172 in cylinder 164 (FIGS. 5 and 7) in the direction of arrows 236. This air will then fill recess 170 in the cylinder. As seen in FIG. 5, the exit air proceeds through recess 180 in bearing plate 158 and recess 186 in manifold 46, as indicated by arrows 238. Thereafter, the air passes through aligned holes 192 in disk 188 of the muffler, as shown by arrows 240. As previously pointed out, the edges of each of the holes are rounded, as at 194 (FIG. 5). The purpose of the rounding is to provide a smooth surface for the exit air to pass across. In this way, a noise-deadening effect is obtained. After passing through the muffler, the exit air passes through spray housing 50 as indicated by arrows 242. This air passes on both sides of the leg of the T-forming spray housing 50 (see FIGS. 4 and 12). Thus, the air will pass through the rear of the handpiece. Adaptor nut 220 is similarly formed of a T-shape which is aligned with the spray housing to permit the air to pass therethrough.

The rotation of the air motor will cause the rotation of the chuck assembly which is mounted on rotor 82. Thus, collet sleeve 76, collet 78 and chuck housing 80 will be rotated along with the motor. In this connection it should be noted, as best seen in FIG. 1, that the nose assembly is laterally spaced from collet sleeve 76. Spring 108 insures that the edge 120 of nose 52 will be maintained out of contact with the forward edge of the chuck assembly. As previously pointed out, the internal diameter of spring 108 is sufficiently large so as not to interfere with the rotational movement of the chuck assembly. Since the bur 130 is secured within the collet, it will be rotated along with the chuck assembly.

If it is desired to obtain a water spray while using the handpiece of this invention, a spray device could easily be adapted to the handpiece. Thus, as seen in FIG. 1, a pair of spray tubes 244 (one shown) are held on nose 52 by means of collar 246, which is formed of a resilient material, such as spring steel. A tube 248 connects one of the spray tubes 244 with one of the conduits 214 (FIG. 4) and a tube 250 connects the other spray tube 244 with the other conduit 214. A tube 252 is connected to one conduit 212 (FIG. 4) and a tube 254 is connected to the other conduit 212.

In use, air enters tube 252 and water enters tube 254. If desired, of course, the air and water tubes could be reversed, since the tubes and conduits used for the air and water system are identical. The air and water proceed from their respective tubes through the spray housing 50 through tubes 248 and 250, and out of spray tubes 244 where they mix to form a fine mist. The spray tubes are readily removable when dry cutting is desired.

Although the invention has been shown as having separate supplies of air for bore 204 and bore 206, it is to be understood, of course, that a single source of air can be used for both rotating the air motor and supplying the air for the air spray. However, having the separate supplies of air has the advantage that air can be supplied to the spray tubes without supplying water. Thus, the handpiece can also be used as a chip blower by separately controlling the air to the spray tubes.

As previously pointed out, one of the characteristics of the air motor is the fact that high torque, low speed power is obtained. By way of specific example, using an inlet air pressure of approximately 30 p.s.i., the air motor will have a rotational speed of approximately 18,000 r.p.m. At the same time, the torque, as measured by the amount of force to stall a 1/16 inch diameter bur, is approximately 40,000 r.p.m. However, the torque, again as measured by the amount of force necessary to stall a 1/16 inch diameter bur, is only 7 ounces.

It is thus seen that the handpiece of this invention provides a much higher torque than that obtained when using an air turbine handpiece. As pointed out above, there are many instances where this torque is necessary and could only satisfactorily be obtained previously by use of a belt and pulley system. In this connection, it should be noted that the handpeice of this invention is substantially the same size as that used with a belt and pully system.

Using the teachings of this invention, it is possible to vary the torque in a number of ways without changing the speed. For instance, this can be accomplished by increasing the exposed vane area, increasing the air pressure, or increasing either the internal diameter of the cylinder or the outer diameter of the rotor.

Figure 13:
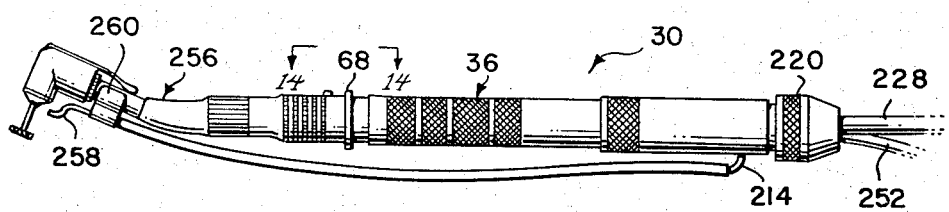
FIG. 13 is a side elevational view similar to FIG. 1, but showing the use of a contra-angle attachment with the handpiece.

If desired, a conventional contra-angle attachment can be placed on the handpiece of this invention. These attachments are in common usage, and have been used in the prior art on the belt and pully handpieces. As seen in FIG. 13, a contra-angle 256 can be snapped on the handpiece 30, which is identical to that described above. The air spray tubes 258 are bent at an angle which is adapted to the contra-angle head. Spray tubes 258 are held in place by slidable spring clip 260.

The rotational power for the contra-angle is obtained by securing a rotor in collet 78. This securement is obtained in exactly the same manner as the securement by a dental bur. The contra-angle is maintained in place by nose 52 by means of a T-shaped slot 262 cut in its top surface. In use, the contra-angle is telescoped over the nose 52 with the set screw 72 engaged in slots 262. With the set screws so engaged, the contra-angle is maintained in place.

The embodiment of the handpiece of FIG. 1 will be effective for substantially all uses desired by a dentist. However, under certain circumstances, there are other features that may be necessary, such as reversibility of direction of rotation and higher torque with lower speed. These features are obtainable by a modification of the handpiece of this invention which is generally shown at 270 in FIG. 15. Since a substantial part of handpiece 270 contains indentical parts to those of embodiment 30, like reference numerals will be used to designate like parts.

Handpiece 270 basically comprises a nose assembly 32, a tubular housing 34, including front section 36 and rear section 38 threadedly secured on the front section at 40. The back of rear section 38 is externally threaded at 218 for the attachment of an adaptor nut 220. Mounted within nose assembly 32 and front tubular section 36 is chuck assembly 42. This chuck assembly is identical in structure and function to that described with respect to handpiece 30.

The novel structure of handpiece 270 includes a speed reducer 272, a reversible air motor 274, a manifold 276, and a spray housing 278.

In one embodiment, the speed reducer comprises a planetary gear transmission which includes a sun gear 280 mounted on an input shaft 282 (see FIGS. 15, 16 and 17). Shaft 282 is flattened on one end 284 and is received in a slot in rotor 286 of air motor 274. Shaft 282 is rotatably mounted in planet carrier 288. Meshing with sun gear 280 and equally spaced there-around are three plant pinions 290 which are mounted on shafts 292. Shafts 292 are rotatably mounted in bearing block 294 and planet carrier 288. Meshing with planet pinions 290 is a ring gear 296. It is thus seen that the incoming rotational power transmitted by rotor 286 to shaft 282 is passed through sun gear 200 and planet pinions 290 to ring gear 296. As further seen in FIG. 16, ring gear 296 has a number of teeth which is approximately three times the number of teeth of planet pinions 290. The number of teeth of the sun gear 280 is approximately equal to the number of teeth of the planet pinions 290. Thus, the rotational speed of the ring gear will approximately be one-third of that of the air motor, with a corresponding threefold increase in the amount of torque produced. Of course, it is to be understood that the gear reduction can be made to any desired amount.

The sun gear is connected to output shaft 298 by pin 300 which passes through the gear and the shaft. Shaft 298 includes a reduced portion 302 which is rotatably mounted in bearing block 294. The forward portion 304 of shaft 298 is mounted in bearing block 306. As seen in FIG. 15, forward portion 304 is externally threaded at 308. Collect 76 is threadedly secured to shaft 304 at 308, in the same manner as shown in FIG. 2 with respect to handpiece 30.

Figure 25:
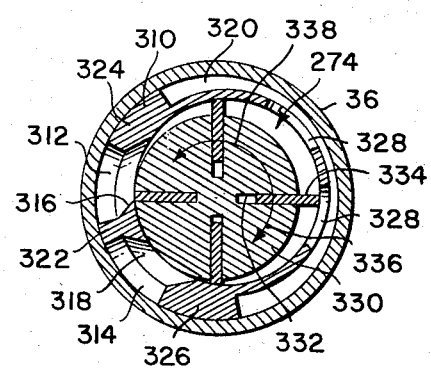
FIG. 25 is an enlarged sectional view taken along the line 25—25 of FIG. 15.
Figure 23:
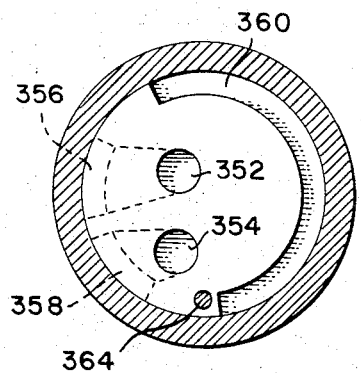
FIG. 23 is a sectional view taken along the line 23—23 of FIG. 19.
Figure 24:
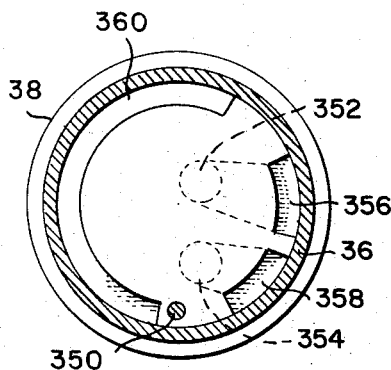
FIG. 24 is a sectional view taken along the line 24—24 of FIG. 19.

The reversible air motor 274 includes a cylinder 310 having a pair of adjacent recesses 312 and 314 formed on one side thereof (FIGS. 15 and 25). Recess 312 is provided with a pair of ports 316 which extend from the recess to the interior of cylinder 310. Recess 314 has a similar pair of ports 318. Cylinder 310 is provided with a recess 320 on the side opposite recess 312 and 314. As seen in FIG. 25, recess 320 extends through slightly more than 180° of the outer circumference of cylinder 310. As further seen in FIG. 25, recesses 312 and 314 are separated by cylinder portion 322, recesses 312 and 320 are separated by cylinder portion 324, and recesses 314 and 320 are separated by cylinder portion 326. A plurality of ports 328 connects recess 320 with the interior of cylinder 310.

Referring again to FIG. 25, it is seen that air motor 274 includes a rotor 330, having four equally spaced longitudinal slots 332, and vanes or blades 334 slidably mounted in slots 332. To this extent, motor 274 is substantially identical in structure and in manner of operation to motor 44 described above. Also, in this embodiment, the rotor 330 is eccentrically mounted within cylinder 310. However, the abutment is on the left side against portion 322, rather than at the top as with motor 44. In use, air enters port 316 thereby causing rotation of the motor in a clockwise direction as shown by arrows 336. The exhausted air passes through ports 328. Alternatively, air enters port 318 causing rotation in a counterclockwise direction as shown by arrow 338. Again, the exhausted air passes through ports 328.

Mounted behind air motor 274 is a bearing plate 340 (FIG. 15). As with handpiece 30, this handpiece also includes a dowel pin 342 to insure proper alignment of the bearing plate and the air motor. Thus, dowel pin 342 is placed within longitudinally aligned holes in the motor and bearing plate. This embodiment may also include ball bearings similar to those shown in FIG. 2. However, they have been omitted from FIG. 15 for the purpose of clarity. Bearing plate 340 includes a pair of recesses 344 and 346 which are aligned with recesses 312 and 314, respectively, of cylinder 310. The bearing plate also includes a recess 348 which is aligned with recess 320 of the air motor.

Mounted behind bearing plate 346 is manifold 276. Again, a sutiable dowel pin 350 is used to maintain the alignment of the bearing plate and the manifold. As seen in FIGS. 15, 18, 19, 20, 23 and 24, manifold 276 includes a pair of bores 352 and 354 which are in communication with recesses 356 and 358, respectively. Recesses 356 and 358 are in turn aligned with recesses 344 and 346, respectively, of bearing plate 340 (FIG. 15). Manifold 376 is also provided with a recess 360 on its outer surface. This recess is aligned with recess 348 in bearing plate 340.

Figure 22:
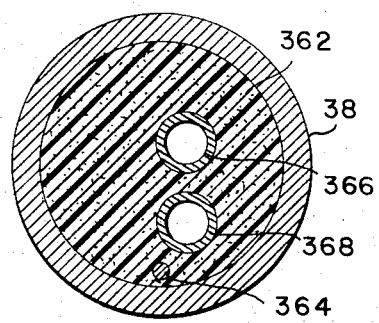
FIG. 22 is a sectional view taken along the line 22—22 of FIG. 19.

Positioned rearwardly of manifold 276 are muffler 362 and spray housing 278. As seen in FIG. 15, dowel pin 364 connects manifold 276, muffler 362 and spray housing 278 to maintain the alignment thereof. The muffler of this embodiment comprises a cylinder of rigid foam. Any porous foam material may be used, such as a polyurethane or polystyrene foam. As seen in FIGS. 15 and 22, conduits 366 and 368 pass through muffler 362. These conduits are aligned with bores 352 and 354, respectively, of manifold 276. It has been found that the rigid foam provides a noise-deadening effect as the exit air passes therethrough.

Figure 21:
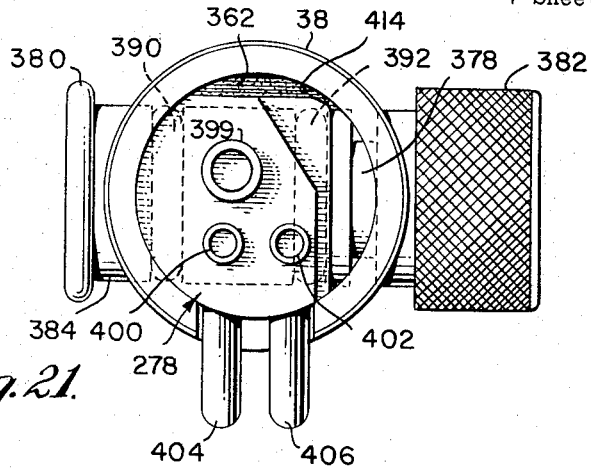
FIG. 21 is an end view taken in the direction of arrows 21—21 of FIG. 15.

As seen in FIG. 21, spray housing 278 is arcuate on its bottom and one side, thereby conforming to the shape of tubular housing 38. Its top and right-hand side are cut away to provide a passage for air exiting from the air motor. A longitudinal bore 370 is formed along the entire length of the spray housing and includes an extension which forms conduit 366 in muffler 362 (FIGS. 18, 19 and 20). A second bore 372 is formed in the forward end of spray housing 278. This second bore includes an extension which comprises conduit 368 in muffler 362. A transverse bore 373 is cut through spray housing 368, as best seen in FIGS. 18, 19 and 20. As seen in FIG. 19, bore 373 cuts through bore 370 and is in communication with bore 372. Tubular member 38 is provided with a pair of aligned openings 374 which are also aligned with bore 373.

Mounted within openings 374 and bore 373 is a rotary valve generally shown at 376 in FIG. 18. Valve 376 includes a central shaft 378 having disk 380 on one end thereof and knurled knob 382 on the other end thereof. Disks 380 and 382 are mounted on the exterior of tubular member 38 and each has a diameter which is larger than openings 374. In this manner, the valve is maintained in place. When it is necessary to remove the valve, this can easily be accomplished by removing knob 382, which can be hold in place by a set screw or other means well known to the art. Monted against disk 380 is a roller 384. Mounted against knob 382 is a roller 386. These rollers are slightly smaller in diameter than opening 374, and are freely rotatable therein.

A third roller 388 is positioned at approximately the center of shaft 378 and is unitary therewith. An O-ring 390 is positioned on shaft 378 between roller 388 and roller 384. A second O-ring 392 is positioned on shaft 378 between roller 388 and disk 394. The purpose of the O-ring is to act as an air seal, as will be explained hereinafter.

As seen in FIG. 19, roller 388 and shaft 378, which are unitary, are provided with a central longitudinal bore 396. A second bore 398 extends angularly from bore 396 and passes through the surface of roller 388.

A conduit 399 extends outwardly from the rear of bore 370. Conduits 400 and 402 also extend out of the rear of spray housing 278 (FIG. 21). Conduits 400 and 402 are connected with a pair of bores 403 in the spray housing (one shown in FIG. 15), which, in turn, are connected with conduits 404 and 406, respectively, which are connected to the bottom of the spray housing. These last mentioned conduits are used in an identical manner to that disclosed with respect to handpiece 30 for supplying an air water spray at the bur.

The handpiece of FIG. 15 is used in the same manner as that of FIGS. 1 and 2. Thus, as seen in FIGS. 15 and 18, air will enter conduit 399 in the direction of arrow 408, pass through bore 370, pass through bore 396, as shown by arrow 410 (FIG. 19), and enter conduit 366. As seen in FIG. 18, the air leaves conduit 366, passes through bore 352 in manifold 276 and into recess 356 in the manifold, as shown by arrows 412. Thereafter, as seen in FIG. 15, the air passes through recess 344 in bearing plate 340 and enters recess 312 in cylinder 310. As seen in FIG. 25, incoming air passes through ports 316 causing the clockwise rotation of air motor 274, as shown by arrow 336. Air motor 274 functions in exactly the same manner as air motor 44 of handpiece 30.

The air in the air motor is exhausted through ports 328 into recess 320 of cylinder 310. Thereafter, as seen in FIG. 15, the air passes through recess 348 in the bearing plate, recess 360 in the manifold, and through rigid foam muffler 362. The air is exhausted through the rear of the handpiece after it leaves the muffler by passing through channel 414 (FIGS. 15 and 18) on the side of spray housing 278 and over the top of spray housing 278 (FIG. 21).

Using the aforementioned path for the air, air motor 274 will be rotated in a clockwise direction. In this connection, it should be noted in FIG. 19 that with valve 376 in the position shown, the air can only travel through bore 352, since bore 398 of the valve abuts a closed wall of the spray housing. As seen in FIG. 18, O-rings 390 and 392 prevent any leakage of air which may escape through bore 398.

If it is desired to cause rotation of the motor in a counter clockwise direction, rotary valve 376 is rotated approximately 60° counterclockwise until bore 396 is in the position shown in FIG. 20. This rotation is carried out by turning knurled knob 382. If desired, suitable stop pins can be placed on tubular housing 38 and a corresponding pin placed on knob 382 to insure that bore 396 is in its proper position for either clockwise or counterclockwise rotation. With the rotary valve in the position shown in FIG. 20, air entering conduit 399 will enter bore 370 and pass through bores 398 and 396 into conduit 368, as shown by arrows 416. The air will then pass through bore 354 of the manifold, recess 358 of the manifold, recess 346 of the bearing plate, and into recess 314 of cylinder 310. As seen in FIG. 25, the air passes from recess 314 through ports 318, thereby causing counterclockwise rotation of the air motor, as shown by arrow 338. The air is then exhausted through ports 328 and follows the same path previously described with respect to clockwise rotation in leaving the handpiece.

In embodiment 270 of the handpiece, rather than having a direct drive on the chuck assembly, the rotational speed of the air motor is reduced with a corresponding increase in torque of the chuck assembly. Thus, it is seen in FIGS. 15, 16 and 17 that the rotational power of the air motor is transmitted through shaft 282 to planet gear 280. Referring to FIG. 16, and assuming the clockwise rotation of gear 280, it will be seen that planet pinions 290 will be rotated in a counter clockwise direction. Gears 290 will in turn rotate ring gear 296 in a clockwise direction. Since shaft 304 is keyed to ring gear 296 by pin 300, the shaft will in turn rotate in the same direction as the ring gear. However, in the embodiment shown, the rotational speed of shaft 304 will be approximately one-third of that of shaft 282, with a corresponding threefold torque increase. Since the chuck assembly is mounted on shaft 304, this increase in torque will be directly transmitted to the chuck assembly and the bur contained therein.

By way of specific example, using the same 30 p.s.i. air pressure described above and the transmission of FIG. 15, a rotational speed of approximately 6,000 r.p.m. is obtained. The torque, measured by the force to stall a 1/16 inch diameter bur is approximately 10 pounds. The reason that the torque does not increase the theoretical three times is caused by the usual frictional and power losses in the transmission.

Figure 26:
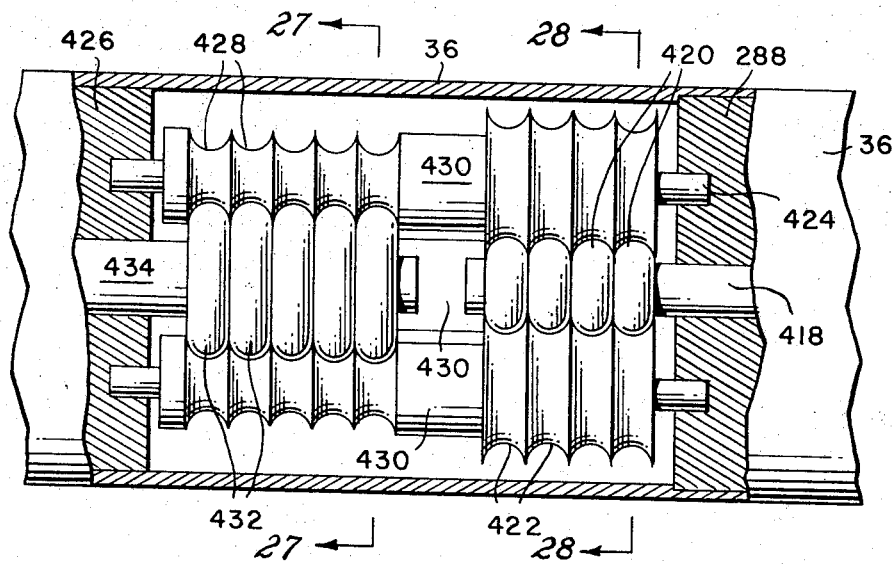
FIG. 26 is a side elevational view, partially broken away, showing an alternate speed reduction drive.
Figure 27:
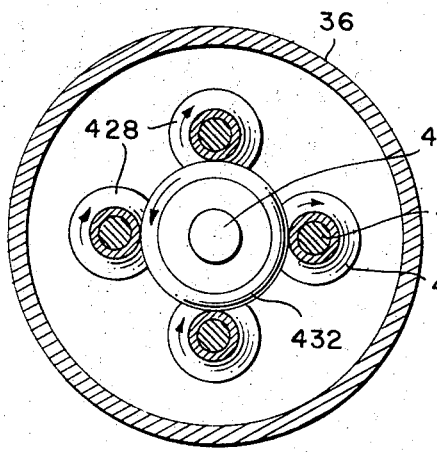
FIG. 27 is a sectional view taken along the line 27—27 of FIG. 26.
Figure 28:
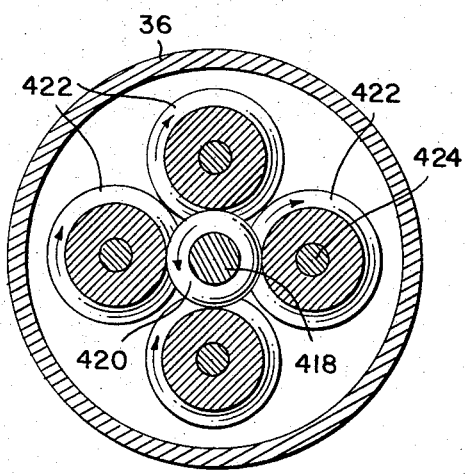
FIG. 28 is a sectional view taken along the line 28—28 of FIG. 26.

In FIGS. 26, 27 and 28 there is shown an alternate speed reduction drive which may be substituted for the planetary gear transmission 272 of FIG. 15. In this embodiment, a shaft 418 is secured to rotor 286 of the aid motor in the same manner of shaft 282. Shaft 418 is rotatably mounted in planet carrier 288. Mounted on shaft 418 are four sun wheels 420. As seen in FIG. 26, each of these wheels has a convex cross-section through its outer perimeter. Frictionally engaging each sun wheel are four planet wheels 422 (FIG. 28). The cross-section through the perimeter of each planet wheel is concave and is complementary with the perimeter of the sun wheel. Planet wheels 422 are mounted on shafts 424. These shafts are in turn rotatably mounted in planet carrier 288 and bearing block 426. A second set of planet wheels 428 are keyed to shafts 424. These second sets of wheels are spaced from wheels 422 by spacer rings 430 which are also keyed to the shafts. Wheels 428 have the same concave cross-section as wheels 422, but are of a smaller diameter than wheels 422. A second set of sun wheels 432 frictionally engage wheels 428. Sun wheels 432 have a convex cross-section that is complementary to the concave cross-section of wheels 428. Wheels 422 are freely rotatable in wheels 428 and are frictionally engaged thereby. Wheels 432 are keyed to shaft 434 which is rotatably mounted in bearing block 426. A collet (not shown) is secured to shaft 434 in the same manner as shown with respect to shaft 304 in FIG. 15.

The transmission of FIG. 26 functions in substantially the same manner as planetary gear transmission 272. However, instead of having gear teeth to provide the necessary rotational power, this power is obtained by friction. Thus, all of the wheels are made of a material having a high co-efficient of friction, such as rubber.

In use, shaft 418 is rotated by the air motor. For the purpose of illustration, assuming the motor is rotating counterclockwise, shaft 418 will likewise rotate counterclockwise, as indicated in FIG. 28. This causes sun wheels 420 to rotate counterclockwise and planet wheels 422 to rotate in a clockwise direction. Since wheels 428 are on the same shaft as wheels 422, they likewise will rotate in a clockwise direction. Sun wheels 432 are then rotated in a counterclockwise direction as seen in FIG. 27. In this way, the collet will be made to rotate in the same direction as the direction of rotation of the air motor. However, in view of the varying diameters of the wheels, shaft 434 will rotate at a lower speed but higher torque than shaft 418. The amount of change from speed to torque is varied by varying the diameter of the wheels in the transmission.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A dental handpiece comprising an elongated housing having a longitudinal axis, chuck means within said housing along said axis, said chuck means including a collet having at least two compressible jaws, means adapted to effectuate closing of said jaws, an air motor mounted within said housing, said air motor including a rotor which is adapted to cause rotation of said collet, speed reduction and torque increasing means associated with said rotor, with said collet being rotatably driven by said speed reduction and torque increasing means, and a conduit for supplying air to rotate said air motor.

2. The handpiece of claim 1 and further including a nose assembly mounted on said tubular housing, said nose assembly being longitudinally movable relative to said housing, a collet sleeve slidably engaging said collet at the front thereof, said means adapted to close said jaws comprising springs means, said spring means being biased against said collet sleeve, said collet sleeve and said collet having complementary tapered front edges, whereby the urging of said spring means against said collet sleeve will depress said compressible jaws, and the movement of said nose assembly against said collet sleeve will depress said spring means thereby opening said jaws.

3. The handpiece of claim 2 wherein said nose assembly is slidable relative to said tubular housing and means are provided for maintaining rectilinear motion of said nose assembly.

4. The handpiece of claim 3 wherein a second spring means urges said nose assembly forward, with means on said housing retaining said nose assembly in place against the urging of said second spring means, and means on said nose assembly to facilitate rearward movement of said nose assembly.

5. The handpiece of claim 2 wherein said collet is secured on said rotor, and the longitudinal alignment of said collet is maintained by a tubular chuck housing which is telescoped over said collet and said rotor.

6. The handpiece of claim 1 wherein said air motor includes a plurality of slots in said rotor, with a vane slidably mounted in each of said slots.

7. The handpiece of claim 1 wherein said motor is eccentrically mounted within a cylinder, with a pair of inlet recesses provided in said cylinder, at least one port connecting each of said recesses with the interior of said cylinder, means for selectively connecting one of said recesses with said conduit supplying air, whereby said air motor can be rotated in a clockwise or counter-clockwise direction depending upon which recess the air enters.

8. The handpiece of claim 7 wherein said selective means comprises a rotary valve.

9. The handpiece of claim 1 and further including muffler means within said housing to reduce the noise of the air exiting from said housing.

10. The handpiece of claim 9 wherein said muffler means comprises a rigid foam material.

11. The handpiece of claim 1 wherein said conduit for supplying air comprises the bore of a spray housing within said elongated housing, said spray housing further including two more bores passing through said housing, conduit means on the entrance and exit of said bores, whereby a water spray can be secured on said housing.

12. The handpiece of claim 1 wherein said speed reduction and torque increasing means comprises a planetary gear system.

13. The handpiece of claim 1 wherein said speed reduction and torque increasing means comprises a system of planetary wheels having surfaces with high coefficients of friction.

14. The handpiece of claim 1 and further including a nose assembly mounted on said housing, said nose assembly enclosing the front of said collet, and means on said nose assembly to aid in the securement of a contra-angle attachment on said handpiece.

15. In a dental handpiece comprising a housing and a nose assembly mounted on said housing, chuck means, said chuck means comprising a collet having at least two compressible jaws, a collet sleeve slidably engaging said collet at the front thereof, first spring means biased against said collet sleeve, said collet sleeve and said collet having complementary tapered front edges, said nose assembly being slidable relative to said housing, means for maintaining rectilinear motion of said nose assembly, second spring means adapted to urge said nose assembly forward, with means on said housing retaining said nose assembly in place against the urging of said second spring means, and means on said nose assembly to facilitate rearward movement of said nose assembly, whereby the urging of said first spring means against said collet sleeve will depress said compressible jaws and the movement of said nose assembly against said collet sleeve will depress said first spring means thereby opening said jaws.

16. The invention of claim 15 wherein said nose assembly includes a sleeve having a longitudinal slot cut therein, with means projecting from said housing into said slot for maintaining rectilinear motion of said nose assembly.

17. The invention of claim 15 and further including a chuck housing which is telescoped over said collet, said collet sleeve being slidable on said chuck housing.

18. The invention of claim 17 wherein first said spring means which are biased against said collet sleeve are also biased against an annular boss projecting from said chuck housing.

References Cited

UNITED STATES PATENTS

| 778,955 | 1/1905 | Dunlevy | 32—26 |
| 2,249,058 | 9/1941 | Staunt | 32—26 |
| 2,492,966 | 1/1950 | Ckola | 253—3 |
| 3,009,249 | 11/1961 | Helm et al. | 32—27 |

FOREIGN PATENTS

| 163,271 | 6/1949 | Austria. |
| 79,622 | 3/1950 | Czechoslovakia. |
| 871,222 | 4/1942 | France. |
| 1,037,283 | 9/1953 | France. |
| 459,485 | 5/1928 | Germany. |
| 357,117 | 8/1922 | Germany. |
| 938,438 | 2/1956 | Germany. |
| 118,88 | 11/1955 | Germany. |
| 424,659 | 8/1947 | Italy. |
| 218,759 | 12/1941 | Switzerland. |

RICHARD A. GAUDET, *Primary Examiner.*

J. W. HINEY, *Assistant Examiner.*